Dec. 22, 1964  M. E. SIEGERT  3,162,480
WINDOW CONTROL MECHANISM
Filed Jan. 2, 1962  2 Sheets-Sheet 1

MILTON E. SIEGERT
INVENTOR
BY John R. Faulkner
John J. Roethel
ATTORNEY

MILTON E. SIEGERT
INVENTOR.

United States Patent Office 3,162,480
Patented Dec. 22, 1964

3,162,480
WINDOW CONTROL MECHANISM
Milton E. Siegert, Livonia, Mich., assignor to Ford Motor Company, Dearborn, Mich., a corporation of Delaware
Filed Jan. 2, 1962, Ser. No. 163,564
9 Claims. (Cl. 296—57)

This invention relates to a control mechanism for holding a window, especially a movable window in a motor vehicle, in any intermediate position between a fully closed and a fully opened position.

Currently, most windows in motor vehicles are adapted to be moved to an opened or closed position by hand cranked or power operated mechanisms. Hand cranking mechanisms require considerable manual effort to operate and power operated mechanisms are expensive to install and maintain.

The simplest, fastest, and least expensive construction and arrangement is one in which the window is manually grasped and pushed to an opened or closed position as desired. This, however, requires the window to be counterbalanced so that a minimum of weight has to be overcome in closing the window and also so that exertion of force to open the window is controlled to prevent a sudden opening movement.

Accordingly, it is an object of the present invention to provide a manually operable window having an improved control mechanism for effectively maintaining a movable vehicle window in fully closed or fully opened position or any intermediate position therebetween. The improved control mechanism includes a window locking and positioning means which coacts with a window counterbalance means, the latter preferably comprising negative spring members which provide a constant or decreasing spring force with increased deflection.

The application of the mechanism embodying the present invention is particularly suitable to station wagon tailgate windows which span the width of the vehicle and are of a relatively heavy weight. The improved mechanism permits the tailgate window to be retracted to an open position upon key release only and to permit closing of the tailgate window from the interior or exterior of the vehicle without key release. This prevents tampering with the vehicle when the tailgate window is in the closed position and also prevents the lowering of the window to any intermediate position between the closed and opened position by unauthorized persons such as children riding in the vehicle. At the same time, the tailgate window can be quickly closed without requiring key release of the operating means in case of rain or whenever the need suddenly arises.

Other objects and advantages of the present invention will become more apparent from the following description when considered in connection with the accompanying drawings in which.

Figure 1:
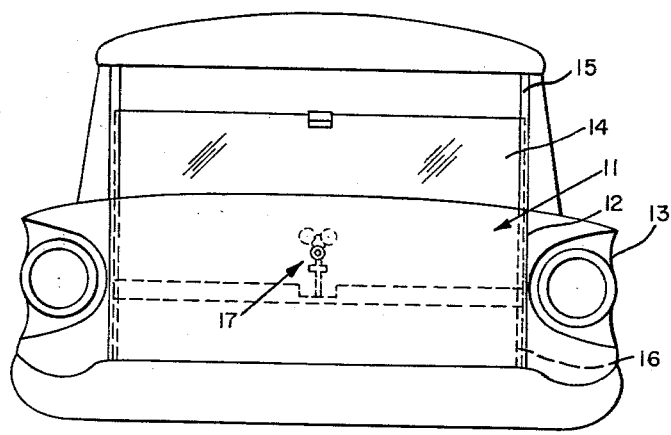
FIGURE 1 is a rear elevational view of a vehicle body showing a station wagon tailgate and window arrangement embodying the control mechanism of this invention.

Referring now particularly to FIGURE 1 of the drawings, there can be seen a tailgate member, generally designated as 11, mounted in a rear exit opening 12 of a station wagon vehicle body 13. The tailgate member 11 is swingably mounted at the lower edge of the vehicle body 13 for movement to a vertical or closed position as shown or to an opened position in which case the tailgate member 11 is disposed in a generally horizontal position with respect to the vehicle body 13.

The tailgate member 11 mounts a window 14 which is movable between a closed position, at which time it completely seals the rear exit opening 12 when the tailgate member 11 is in a vertical position, or to a fully opened position, wherein the window 14 is retracted within the tailgate member 11.

When the window 14 is in a closed position, the opposite side edges of the window 14 are received within guide channels 15 which are affixed to the vehicle body at the upper side edge portions of the opening 12 therein. Since the window 14 is received within the fixed guide channels 15 when in a closed position, the window 14 must be in an opened or retracted position within the tailgate member 11 before the tailgate member 11 can be moved to an opened position in order to prevent any damage to the window 14. Guide means 16 are provided within the tailgate member 11 to retain the window 14 in a substantially normal plane to the axes of the rotating members of the control mechanism of this invention mounted within the tailgate member as hereinafter described. Further, the guide means 16 keep the window 14 aligned with the guide channels 15 attached to the body to permit the movement of the window 14 to a closed position.

Figure 2:
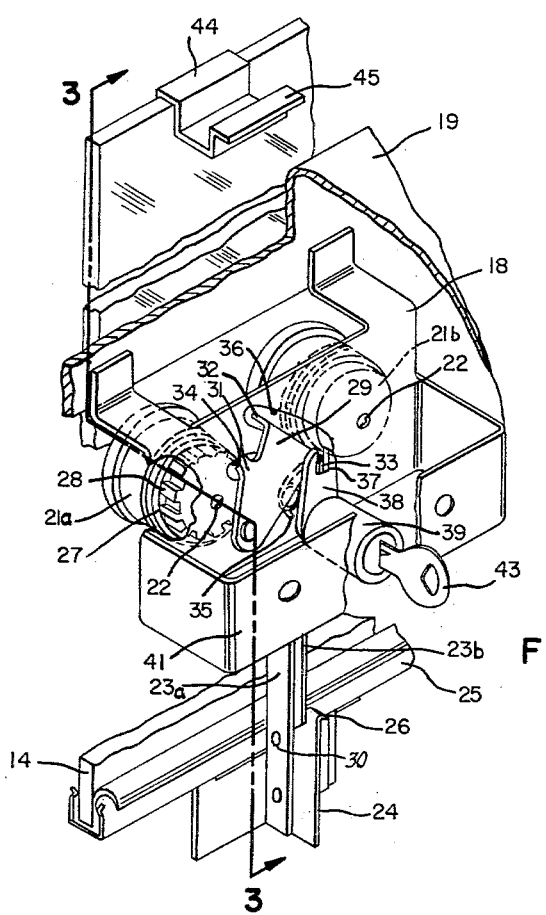
FIGURE 2 is an enlarged perspective view of the window control mechanism of this invention with the tailgate structure partially cut away to provide a clear view of the control mechanism and a portion of the window; and, FIGURE 3 is an enlagred sectional view taken along line 3—3 of FIGURE 2.
Figure 3:
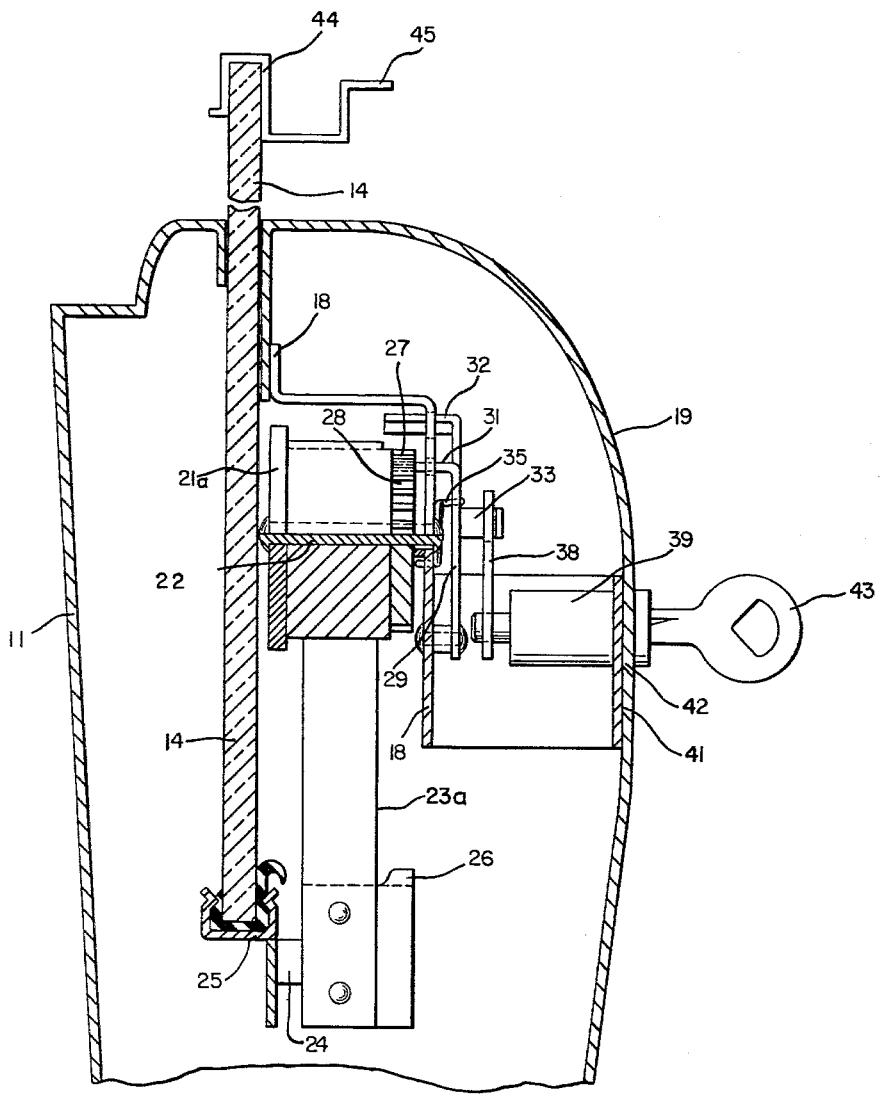

In FIGURES 2 and 3 is seen the window control mechanism of this invention, generally designated as 17, for the window 14 mounted in the tailgate member 11 of the vehicle body 13.

In FIGURE 2 can be seen a support bracket 18 which is installed within the tailgate member 11 between the window 14 and an outer sheet metal member 19 of the tailgate member 11. A pair of transversely spaced drums 21a and 21b are rotatably mounted on pins 22 which are fastened to the bracket 18 in such a manner that the axes of the drums 21a and 21b are maintained perpendicular to the window 14 held by the guide means 16 in the tailgate member 11. A pair of coil spring members 23a and 23b are received on the periphery of drums 21a and 21b respectively though the inner ends of coil spring members 23a and 23b are not directly affixed thereto. The pair of coil spring members 23a and 23b in this instance, are negative spring members which exert their maximum force when the window is in a closed position. Negative spring members are described in greater detail in an article entitled "The Negative Spring, a Basic New Elastic Members," by W. J. Cook and P. C. Clark in Product Engineering, July 1949, page 136–140.

Each negative spring member or coil spring member 23a and 23b, in this instance, comprises an elastic member with flat or negative spring gradients having constant or even decreasing spring force with increased deflection. Coil spring members 23a and 23b are of a type in which the convolutions coil upon themselves normally to form a tightly rolled spiral upon the periphery of the drums 21a and 21b, respectively, when the drums 21a and 21b are held against rotation. Further, coil spring member 23a also possesses the characteristic of coiling loosely with constant or increasing rate of resistance on the periphery of drum 21a but cannot uncoil therefrom when the drum 21a is held against rotation. The outer ends of the pair of coil spring members 23a and 23b are attached in parallel relationship to each other to a bracket 24 by rivets 30. The bracket 24 is affixed to a molding 25 mounted on the lower segment of the window 14. The bracket 24 has a hook 26 at its upper end which function will hereinafter be described.

Drum 21a has a ratchet wheel 27 with notches 28 equally spaced around its circumference. A detent 29 which is pivotally attached to the bracket 18 is located between the bracket 18 and the outer sheet metal panel 19 of the tailgate member 11. The detent 29 is provided with a pawl 31, a diagonally extending flange 32, and a lug 33 with the pawl 31 projecting through a first opening 34 in the bracket 18 to pivotally engage the notches 28 of the ratchet wheel 27.

An overcenter spring 35 has one end attached to the bracket 18 while the other end is fastened to the detent 29 to maintain the pawl 31, when in its normal biased position, engaged in one of the notches 28. The flange 32 which projects through a second opening 36 in the bracket 18 extends between the two transversely spaced drums 21a and 21b. The lug 33 on the detent 29 extends in a direction opposite to that of the flange 32 and pawl 31. This lug 33 is received in a slot 37 cut into the top portion of a lever arm 38. The lower portion of the lever arm 38 is directly attached to a lock cylinder 39 supported in a generally normal relation to the window 14 by an extension arm 41 of the support bracket 18 (see FIGURE 3). The lock cylinder 39 extends through an opening 42 in the outer sheet metal panel 19 of the tailgate member 11 to permit insertion of a key 43 into the lock cylinder 39 from the outside of the vehicle. Rotation of the key 43 in a clockwise direction will result in the rotation of the lever arm 38 which causes the detent 29 to pivot, thereby disengaging the pawl 31 from the notch 28.

An upper window bracket 44 is attached to the upper segment of the window 14. This bracket 44 is trough shaped with a flange 45 projecting outwardly to permit an easy grip on the window 14 for raising or lowering the window manually from the outside of the vehicle body 13.

In the operation of the control means 17 of this invention, the window 14 may be moved downwardly to an opened position by exerting a downward pressure on the bracket 44 when the key 43 is rotated in a clockwise direction in the lock cylinder 39. Clockwise rotation of the key 43 disengages the pawl 31 from one of the notches 28 on the ratchet wheel 27 to release the drum 21a as hereinafter described. Upon movement of the window 14 downwardly, the coil spring members 23a and 23b are free to unwind from the rotatable drums 21a and 21b. When the downward movement of the window 14 is stopped at any intermediate position, the key 43 may be released which causes the overcenter spring 35 to return the detent 29 to its normal biased position. This will result in the pawl 31 engaging one of the notches 28 on the ratchet wheel 27 attached to drum 21a. At this point, the drum 21a is prevented from rotating further and the coil spring member 23a binds on the periphery of the drum 21a preventing further downward movement of the window 14.

To close the window 14, upward pressure is applied at the bracket 44. No key is required since the coil spring member 23a will coil on the periphery of the drum 21a held in a non rotatable condition by the pawl 31 and coil spring member 23b winds freely and tightly on the periphery of the rotatable drum 21b. Coil spring member 23a will coil constrainedly around the periphery of the nonrotatable drum 21a to form a rather loose coil. This coiling of the coil spring member 23a will provide a slipping clutch action which will permit the upward movement of the window to its closed position. As the bracket 24 moves upwardly with the window 14 when it is being raised manually, the hook 26 engages the diagonally extending flange 32 of the detent 29 to provide a camming action which forces the pawl 31 to disengage one of the notches 28, thereby placing drum 21a in a rotatable condition to allow any slack in the loosely coiled coil spring member 23a to be taken up. As the hook 26 of the bracket 24 moves past the flange 32, the detent 29 is returned by the overcenter spring 35 to its normal biased position to force the pawl 31 to engage one of the notches 28 again at which time the window 14 is in a fully closed position.

In this fully closed position, the window 14 is further prevented from being lowered by the hook 26 catching on top of the flange 32 attached to the detent 29. The hook 26 provides an additional safety feature to prevent the window 14 from sliding as the coil spring member 23a may be axially displaced from the drum 21a during swinging movement of the tailgate to a horizontal position to allow some slackening in the coiled coil spring member 23a. To permit retraction of the window 14 into the tailgate member 11 from the fully closed position requires the clockwise rotation of the detent 29. This can only be accomplished by turning the key 43 in the lock cylinder 39 in a clockwise direction.

It will be understood that the invention is not to be limited to the exact construction shown and described but that various changes and modifications may be made without departing from the spirit and scope of the invention as defined in the appended claims.

I claim:

1. A vehicle including an exit opening, a tailgate member pivotally mounted in said exit opening, a window slidably mounted within said tailgate member adapted to move to an opened or closed position, receiving means rotatably mounted on said tailgate member, at least one spring member having one end portion attached to said window and the remaining portion received in a tightly rolled spiral upon said receiving means, said spring member having spring gradients providing a substantial constant spring force with increased deflection, detent means pivotally mounted on said tailgate member engageable with said receiving means, a key operable lever means operable to pivotally disengage said detent means from said receiving means to permit movement of said window to an opened position, the remaining portion of said spring member upon movement of said window to a closed position being received in a coiled condition on said receiving means to provide a slipping clutch action when the latter is engaged by said detent means to permit the closing movement of said window.

2. A vehicle including an exit opening, a tailgate member pivotally mounted in said exit opening, a window mounted within said tailgate member adapted to be moved manually to an opened or closed position, a pair of drums rotatably mounted on said tailgate member, a pair of coil spring members, each coil spring member having one end portion coupled to the lower segment of said window and its remaining portion received in the coiled condition on each of said drums, one of said drums having detent engageable means thereon, detent means mounted on said tailgate member engageable with said detent engageable means to hold said one drum against rotation, a resilient means normally biasing said detent means into engagement with said engageable means, lever means operable to disengage said detent means from said engageable means to place said drum in a rotatable condition, said remaining portion of each of said coil spring members uncoiling from said pair of drums when said one drum is in a rotatable condition to permit movement of said window to an open position, the remaining portion of one of said coil spring members upon movement of said window to a closed position constrainedly coiling on said one drum when the latter is held against rotation to provide a slipping clutch action during closing movement of said window, the remaining portion of the other of said coil spring members coiling freely on the other of said drums which is free to rotate.

3. A vehicle including an exit opening, a tailgate member pivotally mounted in said exit opening, a window slidably mounted within said tailgate member adapted to be moved manually to an opened or closed position, a pair of drums rotatably mounted on said tailgate member, a pair of coil spring members, each coil spring member having one end portion attached to the lower segment of said window and its remaining portion received as a tightly rolled spiral on the periphery of each of said drums, detent means pivotally mounted on said tailgate member, means operably connected to one of said drums engageable by said detent means to hold said one drum against rotation, a resilient means normally biasing said detent means into engagement with said means on said one drum, lever means operable to pivotally disengage said detent means from said means on said drum to permit rotation of said drum, said remaining portion of each of said coil spring members uncoiling from said pair of drums when said one drum is rotatable to permit movement of said window to an open position, the remaining portion of one of said coil spring members upon movement of said window to a closed position constrainedly coiling on said one drum when the latter is held against rotation to provide a slipping clutch action during closing movement of said window, the remaining portion of the other of said coil spring members coiling freely on the other of said drums which is free to rotate.

4. A vehicle including an exit opening, a tailgate member pivotally mounted in said exit opening, guide means within said tailgate member, a window slidably mounted within said guide means and adapted to be moved manually to an opened or closed position, a pair of drums rotatably mounted on said tailgate member, a pair of coil spring members, each coil spring member having one end portion coupled to the lower segment of said window and its remaining portion received in a coiled condition on each of said drums, toothlike means on one of said drums, detent means mounted on said tailgate member engageable with said toothlike means to place one of said drums in a nonrotatable condition, resilient means normally biasing said detent means to place said one drum in a nonrotatable condition, said detent means having a flange, lever means manually operable to disengage said detent means from said toothlike means to permit rotation of said one drum, said remaining portion of each of said coil spring members uncoiling from said pair of drums when said one drum is in a rotatable condition to permit movement of said window to an opened position, an abutment means on the lower segment of said window, the remaining portion of one of said coil spring members upon movement of said window to a closed position constrainedly coiling on said one drum in a nonrotatable condition, said abutment means upon movement of said window to a closed position engaging said flange of said detent means to disengage the latter from said toothlike means thereby placing said one drum in a rotatable condition, the remaining portion of said one of the coil spring members completing its coiling on said one drum when said drum is in a rotatable condition.

5. A vehicle including an exit opening, a tailgate member pivotally mounted in said exit opening, guide means within said tailgate member, a window slidably mounted within said guide means and adapted to be moved manually to an opened or closed position, a pair of drums rotatably mounted on said tailgate member, a pair of coil spring members, said coil spring members providing a substantial constant spring force with increased deflection, each coil spring member having one end portion coupled to the lower segment of said window and its remaining portion received as a tightly rolled spiral on the periphery on each of said drums, toothlike means on one of said drums, detent means pivotally mounted on said tailgate member engageable with said toothlike means to place one of said drums, in a nonrotatable condition, resilient means normally biasing said detent means to place said one drum in a nonrotatable condition, said detent means having a flange, lever means manually operable to pivotally disengage said detent means from said toothlike means to permit rotation of said one drum, said remaining portion of each of said coil spring members uncoiling from said pair of drums when said one drum is in a rotatable condition to permit movement of said window to an opened position, an abutment means on the lower segment of said window, the remaining portion of one of said coil spring members upon movement of said window to a closed position constrainedly coiling on said one drum in a nonrotatable condition, said abutment means upon movement of said window to a closed position engaging said flange of said detent means to disengage the latter from said toothlike means thereby permitting said one drum to rotate, said remaining portion of said one of the coil spring members completing the coiling on said one drum when said one drum is in a rotatable condition.

6. A vehicle including an exit opening, a tailgate member pivotally mounted in said exit opening, guide means within said tailgate member, a window slidably mounted within said guide means and adapted to be moved manually to an opened or closed position, a pair of drums rotatably mounted on said tailgate member, a pair of coil spring members, said coil spring members having flat spring gradients providing a substantial constant spring force with increased deflection, each coil spring member having one end portion coupled to the lower segment of said window and its remaining portion received as a tightly rolled spiral on the periphery on each of said drums, toothlike means on one of said drums, detent means pivotally mounted on said tailgate member engageable with said toothlike means to place one of said drums in a nonrotatable condition, resilient means normally biasing said detent means to place said one drum in a nonrotatable condition, said detent means having a flange, lever means manually operable to pivotally disengage said detent means from said toothlike means to permit rotation of said one drum, said remaining portion of each of said coil spring members uncoiling from said pair of drums when said one drum is in a rotatable condition to permit movement of said window to an opened position, an abutment means on the lower segment of said window, the remaining portion of one of said coil spring members upon movement of said window to a closed position constrainedly coiling on said one drum in a nonrotatable condition, said abutment means upon movement of said window to a closed position engaging said flange of said detent means to disengage the latter from said toothlike means thereby permitting rotation of said one drum, said remaining portion of said one of said coil spring members completing its coiling on said one drum when the latter is in a rotatable condition.

7. A vehicle including an exit opening, a tailgate member pivotally mounted in said exit opening, guide means within said tailgate member, a window slidably mounted within said guide means and adapted to be moved manually to an opened or closed position, said window having an upper and a lower segment, a pair of drums rotatably mounted on said tailgate member, a pair of coil spring members, each coil spring member having one end portion attached to the lower segment of said window and its remaining portion received in a coiled condition on each of said drums, ratchet means on one of said drums, a detent pivotally mounted on said tailgate member, said detent having a pawl and a flange, said pawl engageable with said ratchet means to place said one drum in a nonrotatable condition, resilient means normally biasing said pawl of said detent means to place said one drum in a nonrotatable condition, said one drum in a nonrotatable condition restraining the uncoiling of its corresponding one of the coil spring members, lever means manually operable to pivotally disengage said pawl from said ratchet means to permit rotation of said one drum, said remaining portion of each of said coil spring means uncoiling from said pair of drums when said one drum is in a rotatable condition to permit movement of said window to an opened position, the remaining portion of said one of the coil spring members upon movement of said window to a closed position constrainedly coiling said one drum in a nonrotatable condition thereby providing a slipping clutch action, abutment means on the lower segment of said window, said abutment means engaging said flange of said detent upon movement of said window to a closed position to pivot said detent thereby disengaging said pawl from said ratchet means to place said one drum in a rotatable condition, the remaining portion of said one of the coil spring members completing its coiling on said one drum when the latter is in a rotatable condition, said resilient means returning said pawl to engage said ratchet means upon disengagement of said flange by said abutment means thereby placing said one drum in a nonrotatable condition, said abutment means being in engagement with said flange when said window is in a closed position to prevent movement of said window to an opened position.

8. A vehicle including an exit opening, a tailgate member pivotally mounted in said exit opening, guide means within said tailgate member, a window mounted within said guide means and adapted to be moved manually in a generally vertical direction to on opened or closed position, said window having an upper and a lower segment, a bracket affixed to the upper segment of said window, a pair of drums rotatably mounted on said tailgate member, a pair of coil spring members, each coil spring member having one end portion attached to the lower segment of said window and its remaining portion received in a coiled condition on each of said drums, a ratchet attached to one of said drums, a detent mounted on said tailgate member, said detent having a pawl, a flange, and a lug, said pawl engageable with said ratchet to place said one drum in a nonrotatable condition, resilient means normally biasing said pawl of said detent to place said one drum in a nonrotatable condition, said one drum in a nonrotatable condition restraining the uncoiling of its corresponding one of the coil spring members, a key operable lever operable to engage said lug thereby disengaging said pawl from said ratchet to permit rotation of said one drum, said remaining portion of each of said coil spring members uncoiling from said pair of drums when said one drum is in a rotatable condition to permit movement of said window to an opened position, the remaining portion of said one of the coil spring members upon movement of said window to a closed position constrainedly coiling on said one drum is a nonrotatable condition thereby providing a slipping clutch action, an abutment means on the lower segment of said window, said abutment means engaging said flange of said detent upon movement of said window to a closed position to pivot said detent thereby disengaging said pawl from said ratchet to place said one drum in a rotatable condition, said remaining portion of said one of the coil spring members completing its coiling on said one drum when the later is in a rotatable condition, said resilient means returning said detent with its pawl upon disengagement of said flange by said abutment means to place said one drum in a nonrotatable condition, said abutment means engaging said flange when said window is in a closed position to prevent movement of said window to an opened position.

9. A vehicle including an exit opening, a tailgate member pivotally mounted in said exit opening, guide means within said tailgate member, a window slidably mounted within said guide means and adapted to be moved manually in a vertical direction to a fully opened or fully closed position or any intermediate position therebetween, said window having an upper and a lower segment, a bracket affixed to the upper segment of said window, a pair of drums rotatably mounted on said tailgate member, a pair of coil spring members, each coil spring member providing a substantial constant spring force with increased deflection, each coil spring member having one end portion attached to the lower segment of said window and its remaining portion received in a tightly rolled spiral on the periphery on each of said drums, a ratchet attached to one of said drums, a detent pivotally mounted on said tailgate member, said detent having a pawl, a generally diagonally extending flange, and a lug, said pawl engageable with said ratchet to place said one drum in a nonrotatable condition, resilient means normally biasing said pawl of said detent to place said one drum in a nonrotatable condition, said one drum in a nonrotatable condition restraining the uncoiling of its corresponding one of the coil spring members, a key operable lever engaging said lug thereby pivotally disengaging said pawl to place said one drum in a rotatable condition, said remaining portion of each of said coil spring members uncoiling from said pair of drums when said one drum is in a rotatable condition to permit movement of said window to an opened position, the remaining portion of said one of the coil spring members upon movement of said window to a closed position constrainedly coiling on said one drum in a nonrotatable condition thereby providing a slipping clutch action, an abutment means on the lower segment of said window, said abutment means engaging the lower surface of said generally diagonally extending flange of said detent upon movement of said window to a fully closed position to pivot said detent thereby disengaging said pawl from said ratchet to permit rotation of said one drum, said remaining portion of said one of the coil spring members completing its coiling up on said one drum when the latter is in a rotatable condition, said resilient means returning said detent thereby engaging said pawl with said ratchet upon disengagement of said flange by said abutment means to place said one drum in a nonrotatable condition, said abutment means engaging the upper surface of said diagonally extending flange when said window is in a fully closed position to prevent movement of said window to an opened position.

References Cited in the file of this patent

UNITED STATES PATENTS

| | | |
|---|---|---|
| 409,569 | Doren | Aug. 20, 1889 |
| 881,783 | Erb | Mar. 10, 1908 |
| 1,473,739 | Rawlings | Nov. 13, 1923 |
| 2,609,192 | Lermont | Sept. 12, 1952 |
| 2,970,006 | Velavicius | Jan. 31, 1961 |

FOREIGN PATENTS

| | | |
|---|---|---|
| 723,056 | Great Britain | Feb. 2, 1955 |